(12) United States Patent
Ophir

(10) Patent No.: US 6,944,235 B2
(45) Date of Patent: Sep. 13, 2005

(54) SYSTEM AND METHOD OF DATA COMMUNICATION USING TRELLIS CODED MODULATION OR TURBO TRELLIS CODED MODULATION IN COMBINATION WITH CONSTELLATION SHAPING WITH OR WITHOUT PRECODING WHEN USING CONCATENATED CODING SCHEMES OR WHEN WORKING IN A NON-ERROR FREE OPERATION POINT

(75) Inventor: Lior Ophir, Herzlia (IL)

(73) Assignee: Texas Instruments Incorporated, Dallas, TX (US)

( * ) Notice: Subject to any disclaimer, the term of this patent is extended or adjusted under 35 U.S.C. 154(b) by 792 days.

(21) Appl. No.: 09/900,395

(22) Filed: Jul. 6, 2001

(65) Prior Publication Data

US 2002/0037055 A1 Mar. 28, 2002

Related U.S. Application Data
(60) Provisional application No. 60/217,767, filed on Jul. 12, 2000.

(51) Int. Cl.$^7$ ................................................. H04L 5/12
(52) U.S. Cl. ...................... 375/265; 375/298; 375/341; 375/348; 714/755; 714/774; 714/792

(58) Field of Search .................................. 375/261, 262, 375/265, 298, 324, 340, 341, 346, 348; 714/755, 756, 774, 792, 795

(56) References Cited

U.S. PATENT DOCUMENTS

| | | | | |
|---|---|---|---|---|
| 5,321,725 A | * | 6/1994 | Paik et al. .................. | 375/265 |
| 5,838,728 A | * | 11/1998 | Alamouti et al. ............ | 375/265 |
| 6,584,140 B1 | * | 6/2003 | Lee ............................ | 375/132 |
| 6,584,593 B1 | * | 6/2003 | Seshadri et al. ............ | 714/752 |

* cited by examiner

*Primary Examiner*—Dac V. Ha
(74) *Attorney, Agent, or Firm*—Abdul Zindani; W. James Brady, III; Frederick J. Telecky, Jr.

(57) ABSTRACT

A technique that combines either a trellis coded modulation (TCM) coding scheme or a turbo trellis coded modulation (TTCM) coding scheme with constellation shaping and precoding schemes, and further in combination with concatenated coding schemes or when working in a non-error free operation point, to implement a binary coded communication system and method that can achieve high performance (high coding gains achieved in combination with shaping gain, and when necessary, also with high performance in ISI-channels via precoding).

17 Claims, 3 Drawing Sheets

SYSTEM AND METHOD OF DATA COMMUNICATION USING TRELLIS CODED MODULATION OR TURBO TRELLIS CODED MODULATION IN COMBINATION WITH CONSTELLATION SHAPING WITH OR WITHOUT PRECODING WHEN USING CONCATENATED CODING SCHEMES OR WHEN WORKING IN A NON-ERROR FREE OPERATION POINT

RELATED PATENT APPLICATIONS

This application claims the benefit, under 35 U.S.C. §119(e)(1), of U.S. Provisional Application Ser. No. 60/217,767, entitled Method And System Of Data Communication Using Constellation Shaping, Precoding And Coding, filed on Jul. 12, 2000 by Lior Ophir. This application is related to U.S. Patent Application entitled System and Method of Data Communication Using Turbo Trellis Coded Modulation Combined With Constellation Shaping With or Without Precoding, Docket No. 30916, filed on by Lior Ophir.

BACKGROUND OF THE INVENTION

1. Field of the Invention

This invention relates generally to constellation shaping, precoding and coding, and more particularly to a method and system of combining either turbo trellis coded modulation (Turbo-TCM/TTCM) or trellis coded modulation (TCM) with constellation shaping with/without precoding when using concatenated coding schemes or when working in a non-error free operation point.

2. Description of the Prior Art

Constellation shaping is a means for selecting the stream of transmitted symbols in a communication system, according to a criterion of minimum average power under the constraint of a given minimum distance between neighboring points. By doing that, the constituent two-dimensional constellation is "shaped" into a certain form (with a certain probability distribution between the constellation points). Thus, a symbol sequence with a lower average power can be used (or alternatively a sequence with a high inter-symbol distance between neighboring points for a given power constraint). This results in "shaping gain" which may cause the communication system to become more robust to noise and channel impairments, or result in higher achievable data rates.

Two known methods of constellation shaping are trellis shaping and shell mapping. On Gaussian channels with intersymbol interference (ISI), it is often desired to use precoding methods to mitigate channel distortion. Tomlinson-Harashima (TH) precoding is a well known precoding scheme for ISI-channels.

When constellation shaping is used in ISI channels, it is desired to use a combination of shaping and precoding. A method of combining trellis shaping with TH-precoding is called trellis precoding. Combining shell mapping with precoding can be done by incorporating Laroia precoding. It is known in the art that lattice codes can also be combined with trellis shaping and trellis precoding. Thus, trellis coded modulation (TCM) schemes can be combined with shaping and precoding to achieve coding gain together with shaping gain, and to have high performance, even in ISI-channels.

Lattice codes (e.g. TCM) can also be combined with shell mapping and Laroia precoding to achieve coding gain together with shaping gain, and to have high performance, even in ISI-channels. This is done for example, in the ITU V.34 standard for voice grade modems.

Recently, a new coding technique, "turbo coding" was introduced, which can be used to achieve higher coding gains than other coding schemes; and when used in communication systems, as demonstrated by the present inventor, can result in better robustness to noise and other impairments, or in higher (closer to capacity) data rates. Whereas the original work in the field of turbo coding addresses the case of binary transmission, new schemes have recently been developed for incorporating turbo coding when using larger constellations. These schemes are referred to as Turbo trellis coded modulation (TTCM). Combining a TTCM coding scheme with constellation shaping and precoding schemes can achieve better performance (higher coding gains achieved in combination with shaping gain, and when necessary, also with high performance in ISI-channels via precoding) than existing methods and systems.

Figure 1:
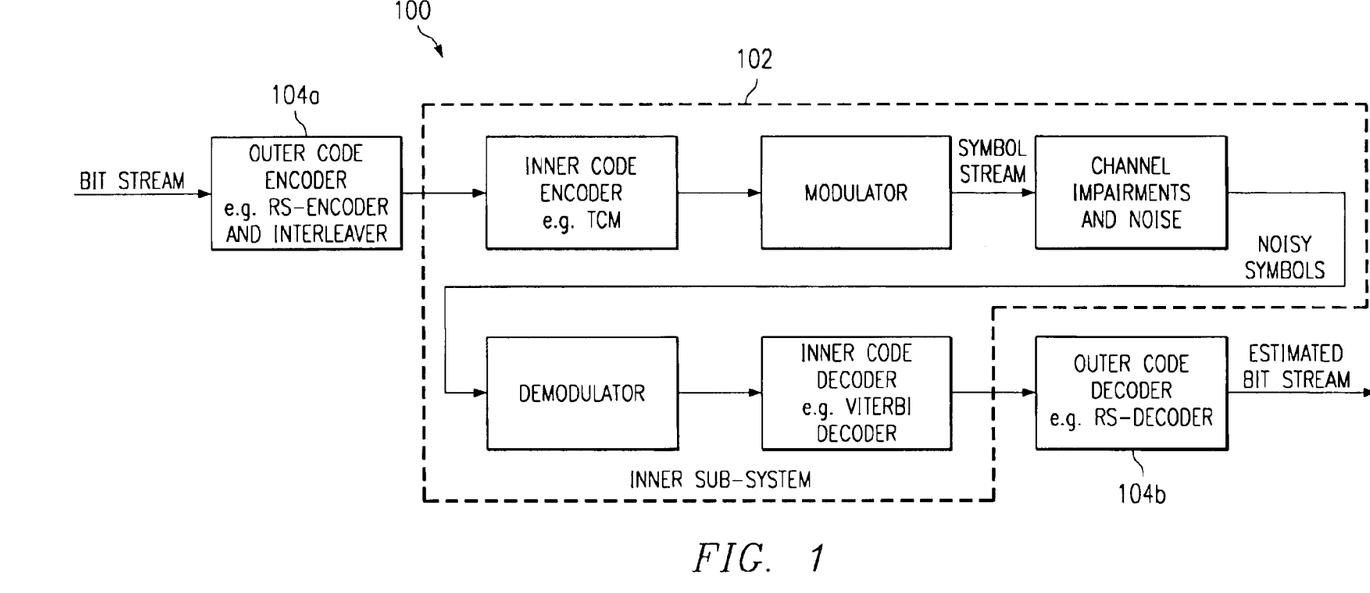
FIG. 1 is a simplified block diagram illustrating a communication system with concatenated coding.

In communication systems, it is frequently desired to use two (or more) concatenated coding schemes such as seen in FIG. 1. Regarding the case when two codes are used, one code is called the inner code and the other is called the outer code. By incorporating the combination of two codes, better performance to complexity tradeoffs can be achieved. This can be implemented by using two less complex coding schemes, which, when combined, result in high performance.

Interleaving methods are often used in conjunction with concatenated coding schemes. When using concatenated coding schemes, the symbols at the output of the inner decoder may still have errors. These errors can be detected and/or corrected by the decoder of the outer code. The inner sub-system is therefore operating in a non-error free operation point, from it input to its output.

In view of the foregoing, it is desirable to provide a technique that combines either a trellis coded modulation (TCM) coding scheme or a turbo trellis coded modulation (TTCM) coding scheme with constellation shaping and precoding schemes, and further in combination with concatenated coding schemes or when working in a non-error free operation point, to implement a binary coded communication system and method that can achieve high performance (high coding gains achieved in combination with shaping gain, and when necessary, also with high performance in ISI-channels via precoding).

SUMMARY OF THE INVENTION

The present invention is directed to a technique that combines either a trellis coded modulation (TCM) coding scheme or a turbo trellis coded modulation (TTCM) coding scheme with constellation shaping and precoding schemes, and further in combination with concatenated coding schemes or when working in a non-error free operating point, to implement a binary coded communication system and method that can achieve high performance (high coding gains achieved in combination with shaping gain, and when necessary, also with high performance in ISI-channels via precoding).

According to one embodiment, a binary coded data communication system comprises:

a transmitter having an outer code encoder and interleaver, an inner code encoder element selected from the group consisting of (a turbo trellis coded modulator (TTCM) and a trellis coded modulator (TCM)), a constellation shaping element, and a mapping element; and a receiver having an inner code decoder, constellation shaping elements, and an outer code decoder, wherein the transmitter mapping element is operational to generate a plurality of symbols in response to a plurality of bit streams that are generated via the inner encoder and transmitter constellation shaping element in response to a partitioned bit sequence that is generated by the outer code encoder and interleaver, and further wherein the receiver is operational to receive the plurality of symbols over a transmission medium and there from estimate the partitioned bit sequence via the receiver inner code decoder, receiver constellation shaping elements, and outer code decoder, such that a non-partitioned bit sequence can be recovered.

According to another embodiment, a method of binary coded data communication comprises the steps of:

providing a transmitter having an outer code encoder and interleaver, and further having an inner coded encoder selected from the group consisting of (a trellis coded modulator (TCM) encoder and a turbo trellis coded modulator (TTCM) encoder), a constellation shaping element, and a mapping element;

processing a desired binary coded input bit stream via at least the outer code encoder and interleaver to provide a desired inner bit stream; and processing the desired inner bit stream via at least the inner encoder and the mapping element to generate a plurality of symbols.

Optionally, the method step of processing the desired inner bit stream comprises the steps of:

partitioning the desired inner bit stream into a first binary coded bit stream having k-bits, a second binary coded bit stream having N*k-bits (where k complies with the rate k/n inner code), and a third binary coded bit stream having the remaining bits;

processing the second binary coded bit stream via the inner encoder to generate a code selected from the group consisting of (a TTCM code and a TCM code);

processing the first binary coded bit stream via the constellation shaping element to generate N shells; and mapping the selected code, the N shells, and the remaining bits via the mapping element to generate the plurality of symbols, wherein the remaining bits are operational to select between multiple cosets within each shell.

The method of binary coded data communication optionally further comprises the steps of:

providing a receiver having an inner code decoder and constellation shaping elements; and processing the plurality of symbols via the inner code decoder and the receiver constellation shaping elements to estimate the desired input bit stream.

The method step of processing the desired input bit stream most preferably comprises the steps of:

partitioning every block of the desired input bit stream into a first binary coded bit stream having K-bits and a second binary coded bit stream having N*b'-K bits, processing the first binary coded input bit stream via a shell mapper to generate N shells represented by a third binary coded input bit stream; and combining the third binary coded input bit stream and the second binary coded input bit stream via a combination element to generate the desired binary coded input bit stream; and processing the desired binary coded input bit stream via the outer code encoder and interleaver to provide a desired inner bit stream.

The method step of processing the desired inner bit stream more preferably comprises the steps of:

partitioning the desired inner bit stream into a first inner binary coded bit stream representing N shells, a second inner binary coded bit stream having N*k bits, and a third inner binary coded bit stream having the remaining bits;

processing the second inner binary coded bit stream via the inner encoder to generate a code selected from the group consisting of (a TTCM code and a TCM code); and mapping the selected code, the N shells, and the remaining bits via the mapping element to generate the plurality of N symbols, wherein the first inner binary coded bit stream is operational to select the shells for each symbol, the selected code is operational to select the coset within the shell, and the remaining bits are operational to select between multiple cosets within each shell.

The method of binary coded data communication more preferably further comprises the steps of:

providing a receiver having an inner code decoder and constellation shaping elements; and processing the plurality of symbols via the inner code decoder and the receiver constellation shaping elements to estimate the desired binary coded input bit stream.

BRIEF DESCRIPTION OF THE DRAWINGS

Other aspects and features of the present invention and many of the attendant advantages of the present invention will be readily appreciated as the same become better understood by reference to the following detailed description when considered in connection with the accompanying drawings in which like reference numerals designate like parts throughout the figures thereof and wherein.

While the above-identified drawing figures set forth alternative embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION OF THE PREFERRED EMBODIMENTS

In communication systems, it is frequently desired to use two (or more) concatenated coding schemes such as depicted in the system 100 shown in FIG. 1. When two codes are used to implement the communication system 100 illustrated in FIG. 1, one code is called the inner code 102 while the other is called the outer code 104 (e.g. encoder 104*a* and decoder 104*b*). By incorporating the combination of two codes, better performance to complexity tradeoff can be achieved. This can be achieved, for example, by using two less complex coding schemes, which when combined, result in high performance. Interleaving methods are often used in conjunction with concatenated coding schemes.

Communication systems may benefit from the use of two (or more) concatenated coding schemes as described herein before with reference to FIG. 1. When combining coding and constellation shaping with/without precoding when operating in a non-error free operation point, and/or when using concatenated coding schemes, the present inventor found that 1) known coding schemes (e.g. TCM or TTCM) may be used as the inner code as discussed herein below; 2) known coding schemes (e.g. Reed-Solomon (RS)) may be used as the outer code; 3) known constellation shaping methods may be used, for example, trellis shaping or shell mapping; and 4) precoding may also be used together with the shaping and concatenated coding system.

Figure 2:
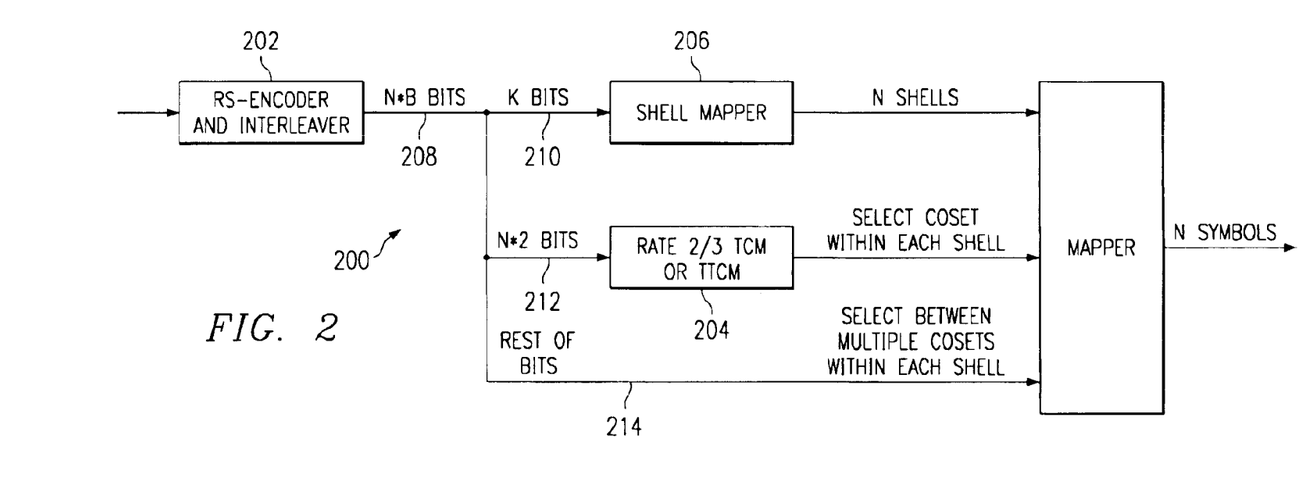
FIG. 2 is a simplified block diagram illustrating a transmitter that combines shell mapping with concatenated coding according to one embodiment of the present invention.
Figure 3:
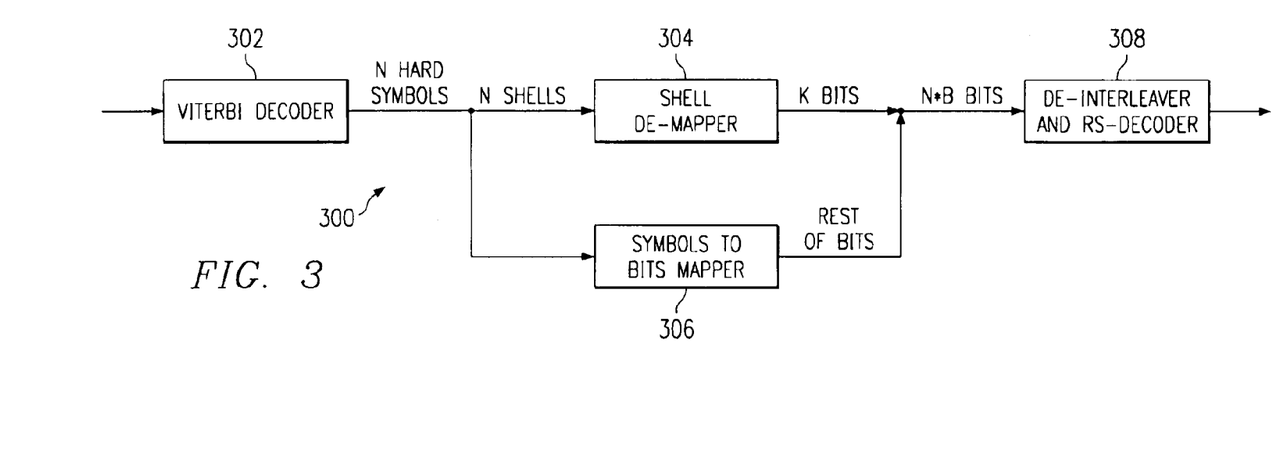
FIG. 3 is a simplified block diagram illustrating a receiver that combines shell mapping with concatenated coding according to one embodiment of the present invention.

FIG. 2 is a simplified block diagram illustrating a transmitter 200 that combines shell mapping 206 with concatenated coding (RS-coding 202 as the outer code and rate ⅔ TCM or TTCM 204 as the inner code) according to one embodiment of the present invention, while FIG. 3 is a simplified block diagram illustrating a receiver 300 that combines shell mapping with concatenated coding according to one embodiment of the present invention. The inner bit stream is passed through the (RS-encoder and interleaver) 202. It is then divided into blocks of N*b-bits 208, each resulting in N consecutive 2D symbols. Each block is divided into three parts. The first part 210, consisting of K bits, is used to select N shells using shell mapping 206. The second part 212, consisting of N*k-bits, is passed through the encoder 204 of the TCM or TTCM, resulting in N cosets. The remaining bits 214 comprise the third part. A constellation point is then selected in each of the 2D symbols as follows: The shells are selected according to the output of the shell mapper 206. The coset within the shell is selected according to the output of the TCM or TTCM encoder 204. The rest of the bits 214 in the block are used to select between multiple cosets in each of the shells (if there is more than one coset in a shell).

In V.34, described in ITU-T Recommendation V.34, September 1994, incorporated by reference herein, 2N=16 dimensional shell mapping and precoding are implemented, and work together with TCM, without a concatenated coding scheme. The present inventor employed the same scheme to simulate shell mapping together with TTCM or TCM using different constellations and shaping parameters with results shown in Table 3 below; wherein the complexity of shell mapping is similar in the transmitter and the receiver, and results from the storage of some vectors used by the shell mapper, and from the actual mapping procedure.

TABLE 3

| Data rate R information bits/symbol | Constellation Without-> With shaping | Theoretical shaping gain [dB] | Actual shaping gain [dB] | Shaping parameters used K, M, L** | Remarks |
|---|---|---|---|---|---|
| 3 | 8QAM->12QAM | 0.67 | 1.18 | 8, 3, 12 | Compatible with rate-1/2 code |
| 3 | 8QAM->16QAM | 0.70 | 1.21 | 8, 4, 16 | Compatible with rate-1/2 code |
| 4 | 16QAM->24QAM | 0.84 | 0.56 | 16, 6, 24 | Compatible with rate-1/2 code |
| 4 | 16QAM->28QAM | 0.85 | 0.56 | 16, 7, 28 | Compatible with rate-1/2 code |
| 5 | 32CR->48QAM | 0.88 | | 0.60 | Compatible with rate-1/2 code |
| 5 | 32CR->56QAM | 0.90 | 0.62 | 24, 14, 56 | Compatible with rate-1/2 code |
| 6 | 64QAM->96QAM | 0.88 | 0.82 (0.71)* | 24, 12, 96 | Compatible with rate-1/2 code |
| 6 | 64QAM->96QAM | 0.93 | 0.86 (0.75)* | 24, 14, 112 | Compatible with rate-1/2 code |
| 7 | 128QAM->192QAM | 0.90 | 0.71 | 24, 12, 192 | Compatible with rate-1/2 code |
| 7 | 128QAM->224QAM | 0.94 | 0.74 | 24, 14, 224 | Compatible with rate-1/2 code |
| 4 | 16QAM->24QAM | 0.38 | 0.1 | 8, 3, 24 | Compatible with rate-2/3 code |
| 5 | 32CR->48QAM | 0.73 | 0.45 | 16, 6, 48 | Compatible with rate-2/3 code |
| 5 | 32CR->56QAM | 0.76 | 0.48 | 16, 7, 56 | Compatible with rate-2/3 code |
| 6 | 64QAM->96QAM | 0.86 | 0.79 (0.68)* | 24, 12, 96 | Compatible with rate-2/3 code |
| 6 | 64QAM->96QAM | 0.90 | 0.84 (0.73)* | 24, 14, 112 | Compatible with rate-2/3 code |
| 7 | 128QAM->192QAM | 0.91 | 0.72 | 24, 12, 192 | Compatible with rate-2/3 code |
| 7 | 128QAM->224QAM | 0.94 | 0.76 | 24, 14, 224 | Compatible with rate-2/3 code |

The single * means that actual shaping gain was calculated relative to a square constellation. Using a trivial 2D "constellation shaping" (i.e. using a circle constellation rather than a square) yields the relative shaping gain shown in parentheses.

TABLE 3-continued

| Data rate R information bits/symbol | Constellation Without-> With shaping | Theoretical shaping gain [dB] | Actual shaping gain [dB] | Shaping parameters used K, M, L** Remarks |
| --- | --- | --- | --- | --- |

The double ** means that K is the number of bits that enter the shell mapper for every block of eight 2D symbols (16D symbols). The letter M is the number of shells per 2D constellation and L is the enlarged 2D constellation size. The ratio L/M gives the number of 2D constellation points per shell. For rate-1/2 codes, this should be a multiple of 4, and for rate-2/3 codes, this should be a multiple of 8 (necessary but not sufficient requirements. For compatibility with a code based on constellation partitioning, there should be in each shell the same number of points from every subset. Looking at the results in Table 3, a 0.3 dB degradation in shaping gain can be seen when trying to transmit 4 bits/symbol compatible with a rate-2/3 code. This seems to occur due to the "large" shells in comparison to the constellation, whereas symbols within the shells are uniformly distributed.

The single * means that actual shaping gain was calculated relative to a square constellation. Using a trivial 2D "constellation shaping" (i.e. using a circle constellation rather than a square) yields the relative shaping gain shown in parentheses. The double ** means that K is the number of bits that enter the shell mapper for every block of eight 2D symbols (16D symbols). The letter M is the number of shells per 2D constellation and L is the enlarged 2D constellation size. The ratio L/M gives the number of 2D constellation points per shell. For rate-½ codes, this should be a multiple of 4, and for rate-⅔ codes, this should be a multiple of 8 (necessary but not sufficient requirements. For compatibility with a code based on constellation partitioning, there should be in each shell the same number of points from every subset. Looking at the results in Table 3, a 0.3 dB degradation in shaping gain can be seen when trying to transmit 4 bits/symbol compatible with a rate-⅔ code. This seems to occur due to the "large" shells in comparison to the constellation, whereas symbols within the shells are uniformly distributed.

In the receiver 300 shown in FIG. 3, a Viterbi decoder 302 is used to produce hard decisions based on the noisy symbols received (this is compatible with a TCM inner code; for a TTCM inner code, a turbo-decoder is used). For each block of N symbols, the original K-bits are produced by the shell de-mapper 304; whereas the rest of the bits are produced by the symbols-to-bits mapper 306. When no errors occur, the original N*b-bits 208 at the output of the RS-encoder 202 are recovered. These bits are passed through a (de-interleaver and RS-decoder) 308, so even when there are still errors, these errors may be corrected (or detected); and the original input bits can be recovered. When errors are detected that cannot be corrected, retransmissions may take place.

The present invention is not so limited however, and it can be appreciated that Laroia precoding, for example, can also be implemented in a manner such as discussed herein before. When using this scheme though, an error in one detected symbol in the Viterbi decoder 302 output may cause an error in the selected corresponding shell of the symbol. Due to the nature of the shell mapper 206 and shell de-mapper 304, this might result in several (up to K) erroneous bits at the output of the shell de-mapper 304. Performance may therefore be degraded, and the full shaping gain might not be achieved together with the full coding gain of the concatenated coding system. One way to combat this problem is to use an appropriate (interleaver and RS-encoder) 202, such that the burst of (up to K) erroneous bits, resulting from one erroneous shell, will be spread among several RS-codewords. Another approach is now described herein below with reference to FIGS. 4 and 5.

Figure 4:
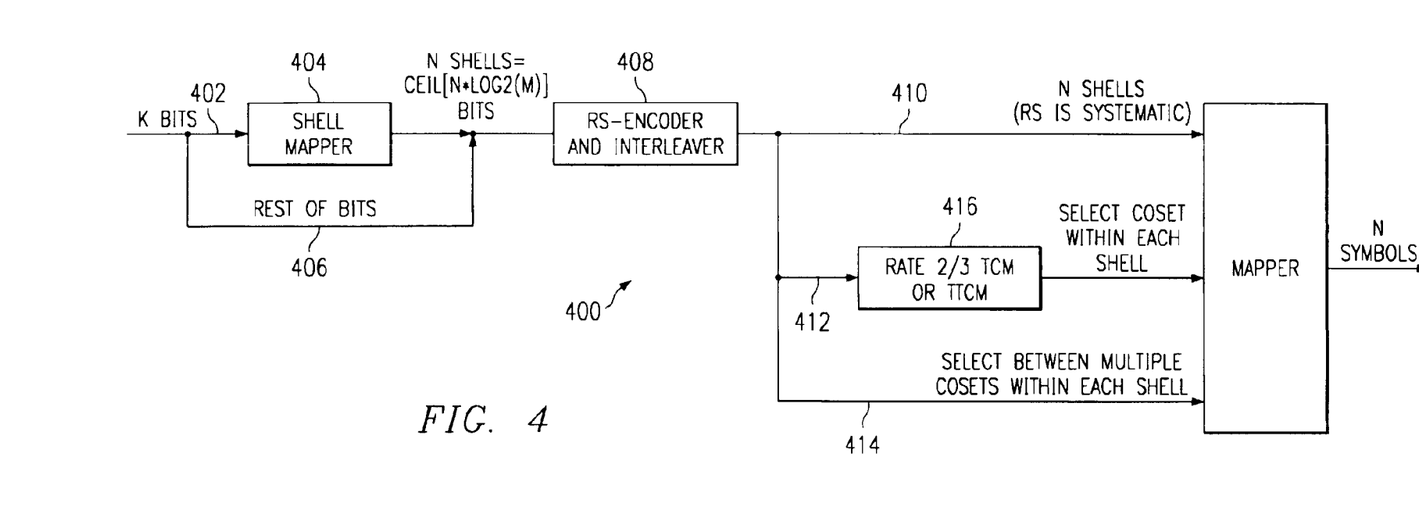
FIG. 4 is a simplified block diagram illustrating a transmitter that combines shell mapping with concatenated coding according to another embodiment of the present invention.
Figure 5:
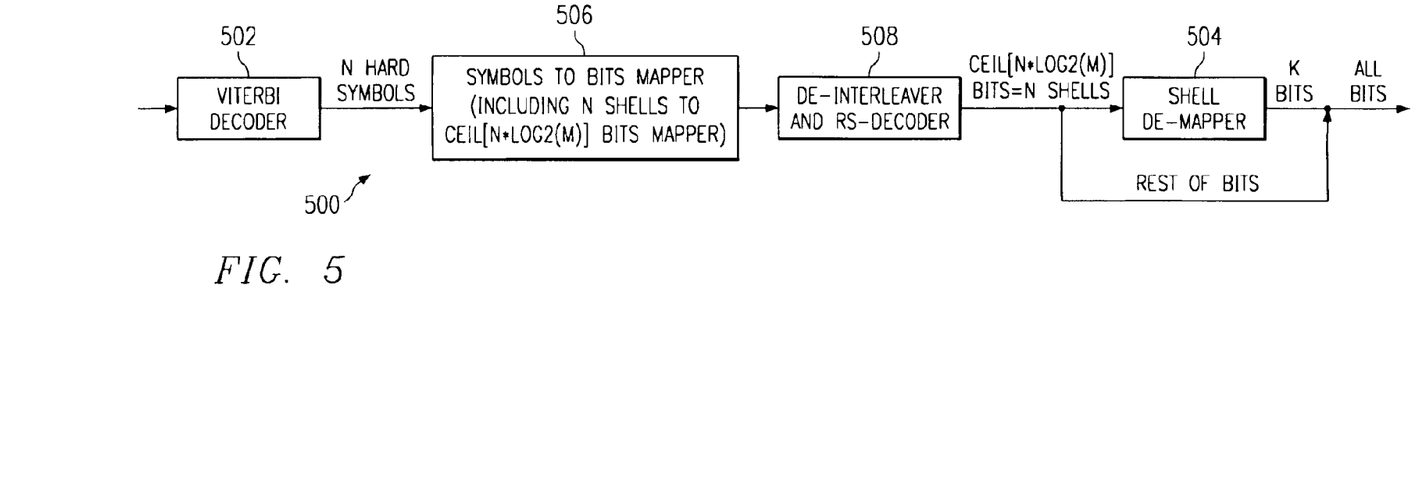
FIG. 5 is a simplified block diagram illustrating a receiver that combines shell mapping with concatenated coding according to another embodiment of the present invention.

FIG. 4 is a simplified block diagram illustrating a transmitter 400 that combines shell mapping with concatenated coding according to another embodiment of the present invention; and FIG. 5 is a simplified block diagram illustrating a receiver 500 that combines shell mapping with concatenated coding according to another embodiment of the present invention. A communication system that employs transmitter 400 and receiver 500 takes advantage of the systematic property of the RS-code in order to overcome the problems discussed herein above. With reference now to FIG. 4, the input bit stream is divided into blocks of N*b'-bits (with consideration given for choosing b' discussed herein below). This block will result in N consecutive 2D symbols. Each block is divided into two parts. The first part 402, consisting of K bits, is used to select N shells using shell mapper 404. These N shells are represented using ceil(N*log2(M)) bits. The second part 406, consisting of N*b'-K bits, are passed unchanged. The resulting block of bits is passed through an (RS-encoder and interleaver) 408. Since the RS-encoder is systematic, the output can be divided into three parts. The first part 410 consists of the ceil(N*log2(M)) bits representing the N shells. The second part 412, consisting of N*k bits, is passed through the encoder 416 of the TCM or TTCM, resulting in N cosets (in FIG. 4, k=2). A constellation point in each of the 2D symbols is then selected as follows: The shells are selected according to the first part 410 discussed herein above (the original output of the shell mapper 404 which did not change due to the RS-code being systematic). The coset within the shell is selected according to the output of the TCM/TTCM encoder 416. The rest of the bits 414 in the block are used to select between multiple cosets in each of the shells (if there is more than one coset in a shell). The value of b' discussed herein before, is selected in such a way that at the output of the RS-encoder 408, there will be exactly N shells, represented by ceil(N*log$_2$(M)) bits, and N*b-K more bits).

In the receiver 500 shown in FIG. 5, a Viterbi decoder 502 is used to produce hard decisions based on the noisy symbols received (this is compatible with a TCM inner code, and for a TTCM inner code, a turbo-decoder is used). The bits that are represented by these symbols are extracted by a symbols-to-bits mapper 506 (including the map of the N shells into ceil(N*log$_2$(M)) bits), for each block of N symbols. These bits are then input to a (de-interleaver and RS-decoder) 508 that further corrects errors that might have occurred without being corrected by the inner code decoder. Then from the output bits of the RS-decoder, the original K bits are recovered from the bit representation of the N shells, using a shell de-mapper 504. It can be appreciated that since the shells at the input of the shell de-mapper 504 passed through the inner as well as the outer decoders, the probability of error is less than that associated with the technique discussed herein before with reference to FIGS. 2 and 3. Further, the performance is higher. When errors are detected that cannot be corrected, retransmissions may take place as also discussed herein before.

Shell errors due to incorrect decisions at the Viterbi decoder 502 (or TTCM decoder) output may be corrected using the RS-decoder 508 when using this technique. Further, the decoder 502 may also take advantage of the known properties of the bits representing the shells (such as the fact that not all possible combinations are allowed) to make better decisions. Errors that remain at the RS-decoder 508 output would have been there even if shaping had not been used, and here, as before, will cause either erroneous reception or a request for retransmission. Here, unlike in concatenated coding systems without shaping, these errors will cause error propagation, and might result in up to K erroneous bits a the output of the shell de-mapper 504. In the case of retransmission therefore, it is preferred to keep all these K bits in the same frame that is to be retransmitted.

A slight degradation in data rate is apparent when using the second embodiment discussed herein above with reference to FIGS. 4 and 5 when compared with the first embodiment discussed herein before with reference to FIGS. 3 and 4. This is due to the conversion from K→⌈N log$_2$(M)⌉ bits that is executed before the RS-encoder 508. The redundancy thus induced by the encoder associated with the second embodiment is greater in comparison to that induced by the encoder associated with the first embodiment. Specifically, for RS-encoding of rate k/n, having redundancy of (n-k)/k, a modified combined RS-encoding and shaping of rate $$R_{combined} = \left[\frac{n}{k}\left(1 + \frac{\lceil N\log_2(M)\rceil - K}{b}\right) - \frac{\lceil N\log_2(M)\rceil}{b}\right]^{-1} \text{ is achieved.}$$

Assuming typical values of rate 200/220 RS-code with shaping having the following properties (see Table 3 for 128 QAM): N=8, M=12, K=24, b≈48, $R_{combined}$=1.11$^{-1}$200/222, resulting in a negligible degradation in data throughput. It can be appreciated that maintaining the same data throughput as before can be obtained by using a slightly weaker constituent RS-code of rate 200/218. It can also be appreciated that the RS-code for the shaping bits may be separated from the rest of the bits, using perhaps different coding or interleaving in order to maintain the same data throughput as before. The present inventor found that due to implementation considerations, it may also be easier to represent the N shells using N⌈⌈log 2(M)⌉⌉ bits.

The second embodiment described herein above for combining shell mapping with concatenated coding can also be used in conjunction with precoding (e.g. Laroia precoding), in a manner similar to that discussed herein before. Further, using similar methods to those described above, the transmitter 400 and the precoder can be designed such that the RS-decoder 508 can be inserted before the element that reconstructs the symbols at the precoder input. The concatenated coding thus can also combat error propagation inherent in the Laroia precoder.

Also as described herein before, the embodiments set forth herein may be implemented using trellis shaping in both transmitter and receiver, with some adaptations. It can be appreciated in view of the foregoing discussion, that coding (e.g. RS-coding) may also be combined with a DFE to combat the error propagation phenomenon. Generally, for any scheme that performs well for an error-free operating point, and that might become sensitive when shifted to a non-error free operating point (such as due to concatenation with RS-coding), the techniques presented herein may be used leading to similar transmitter and receiver schemes.

In view of the foregoing descriptions, it should be apparent that the present invention represents a significant departure from the prior art in construction and operation. However, while particular embodiments of the present invention have been described herein in detail, it is to be understood that various alterations, modifications and substitutions can be made therein without departing in any way from the spirit and scope of the present invention, as defined in the claims which follow.

What is claimed is:

1. A method of binary coded data communication, the method comprising the steps of:
    providing a transmitter having an outer code encoder and interleaver, and further having an inner coded encoder selected from a group consisting of a trellis coded modulator (TCM) and a turbo trellis coded modulator (TTCM) encoder, a constellation shaping element, and a mapping element;
    processing a desired binary coded input bit stream via at least the outer code encoder and interleaver to provide a desired inner bit stream; and
    processing the desired inner bit stream via at least the inner encoder and the mapping element to generate a plurality of N symbols wherein the step of processing the desired inner bit stream comprises the steps of:
    partitioning the desired inner bit stream into a first binary coded bit stream having K-bits, a second binary coded bit stream having N*k-bits, (where k complies with a rate k/n inner code), and a third binary coded bit stream having the remaining bits;
    processing the second binary coded bit stream via the inner encoder to generate a code selected from the group consisting of a TTCM code and a TCM code;
    processing the first binary coded bit stream via the constellation shaping element to generate N shells; and
    mapping the selected code, the N shells, and the remaining bits via the mapping element to generate the plurality of N symbols, wherein the remaining bits are operational to select between multiple cosets within each shell, wherein N, n, K, and k are integers.

2. The method according to claim 1, further comprising the steps of:
    providing a receiver having an inner code decoder and constellation shaping elements; and
    processing the plurality of symbols via the inner code decoder and the receiver constellation shaping elements to estimate the desired input bit stream.

3. The method according to claim 2 wherein the step of processing the plurality of symbols via the inner code decoder and the receiver constellation shaping elements to estimate the desired input bit stream comprises the step of receiving the plurality of symbols via a transmission medium and processing the plurality of symbols via a decoder selected from the group consisting of a Viterbi decoder and a turbo decoder to generate a number of hard symbols.

4. The method according to claim 3 wherein the step of processing the plurality of symbols via the inner code decoder and the receiver constellation shaping elements to estimate the desired input bit stream further comprises the steps of:
    processing the number of hard symbols via a shell de-mapper to generate a binary coded bit stream having K-bits; and
    processing the number of hard symbols via a symbols-to-bits mapper to generate a binary coded bit stream having the rest of the bits.

5. The method according to claim 4 wherein the step of processing the plurality of symbols via the inner code decoder and the receiver constellation shaping elements to estimate the desired input bit stream comprises the step of processing the binary coded bit stream having K-bits and the binary coded bit stream having the rest of the bits via a de-interleaver and RS-decoder to estimate the desired input bit stream.

6. The method according to claim 1, further comprising the step of processing the mapped code, the mapped N shells, and the mapped remaining bits via a Laroia precoder prior to generating the plurality of symbols.

7. The method of binary coded data communication according to claim 1 wherein the step of processing a desired binary input bit stream comprises the steps of:
partitioning every block of the desired binary input bit stream into a first binary coded bit stream having K-bits and a second binary coded bit stream having N*b'-K bits;
processing the first binary coded bit stream via a shell mapper to generate N shells represented by a third binary coded bit stream;
combining the third binary coded bit stream and the second binary coded bit stream via a combinational element to generate the desired binary coded input bit stream; and
processing the desired binary coded input bit stream via the outer code encoder and interleaver to provide the desired inner bit stream.

8. The method of binary coded data communication according to claim 7 wherein the step of processing the desired inner bit stream comprises the steps of:
partitioning the desired inner bit stream into a first inner binary coded bit stream representing N shells, a second inner binary coded bit stream having N*k bits, and a third inner binary coded bit stream having the remaining bits;
processing the second inner binary coded bit stream via the inner encoder to generate a code selected from the group consisting of (a TTCM code and a TCM code); and
mapping the selected code, the N shells, and the remaining bits via the mapping element to generate the plurality of N symbols, wherein the first inner binary coded bit stream is operational to select shells for each symbol, the selected code is operational to select a coset within a shell, and the remaining bits are operational to select between multiple cosets within each shell.

9. The method according to claim 8 further comprising the step of processing the mapped code, the mapped N shells, and the mapped remaining bits via a Laroia precoder prior to generating the plurality of symbols.

10. The method according to claim 8 further comprising the steps of:
providing a receiver having an inner code decoder and constellation shaping elements; and
processing the plurality of symbols via the inner code decoder and the receiver constellation shaping elements to estimate the desired binary coded input bit stream.

11. The method according to claim 10 wherein the step of processing the plurality of symbols via the inner code decoder and the receiver constellation shaping elements to estimate the desired binary coded input bit stream comprises the step of receiving the plurality of symbols via a transmission medium and processing the plurality of symbols via a decoder selected from the group consisting of a Viterbi decoder and a turbo decoder to generate a number of hard symbols.

12. The method according to claim 11 wherein the step of processing the plurality of symbols via the inner code decoder and the receiver constellation shaping elements to estimate the desired binary coded input bit stream further comprises the steps of:
processing the number of hard symbols via a symbols-to-bits mapper, a de-interleaver and RS-decoder, to generate a binary coded interleaved bit stream;
partitioning the binary coded interleaved bit stream into a first part representing a number (N) of shells, and a second part having the rest of the bits;
processing the N shells via a shell de-mapper to generate a binary coded output bit stream having K-bits; and
combining the output bit stream and the rest of the bits via a combinational element to estimate the desired binary coded input bit stream and there from recover the input bit stream.

13. The method of binary coded data communication according to claim 1 wherein the step of generating a plurality of symbols comprises the step of generating a signal constellation having shaping regions capable of use in association with shell mapping that is compatible with rate k/n coded modulation selected from the group consisting of trellis coded modulation (TCM) and turbo-trellis coded modulation (TTCM).

14. A binary coded data communication system comprising:
a transmitter having an outer code encoder and interleaver, an inner code encoder element selected from the group consisting of a turbo trellis coded modulator (TTCM) and a trellis coded modulator (TCM), a constellation shaping element, and a mapping element; wherein the inner encoder is configured to process a desired inner bit stream by
partitioning the desired inner bit stream into a first binary coded bit stream having K-bits, a second binary coded bit stream having N*k-bits, (where k complies with a rate k/n inner code), and a third binary coded bit stream having the remaining bits;
processing the second binary coded bit stream via the inner encoder to generate a code selected from the group consisting of a TTCM code and a TCM code,
processing the first binary coded bit stream via the constellation shaping element to generate N shells; and
mapping the selected code, the N shells, and the remaining bits via the mapping element to generate the plurality of N symbols, wherein the remaining bits are operational to select between multiple cosets within each shell; and
wherein the interleaver used in association with the outer code is such that the K bits of the first binary coded bit stream result from several codewords of the outer code, wherein N, n, K, and k are integers.

15. The binary coded data communication system according to claim 14 further comprising:
a receiver having an inner code decoder, constellation shaping elements, and an outer code decoder, wherein the transmitter mapping element is operational to generate a plurality of symbols in response to a plurality of bit streams that are generated via the inner encoder and transmitter constellation shaping element in response to a partitioned bit sequence that is generated by the outer code encoder and interleaver, and further wherein the receiver is operational to receive the plurality of symbols over a transmission medium and there from estimate the partitioned bit sequence via the receiver inner code decoder, receiver constellation shaping elements, and outer code decoder, such that a non-partitioned bit sequence can be recovered.

16. The binary coded data communication system according to claim 15 wherein the transmitter and receiver constellation shaping elements comprise shell mapping elements.

17. The binary coded data communication system according to claim 16 wherein the transmitter further comprises a Laroia precoder operational to condition signals generated via the transmitter mapping element prior to generation of the plurality of symbols by the transmitter mapping element.

* * * * *